United States Patent
Kim et al.

(10) Patent No.: US 6,219,704 B1
(45) Date of Patent: *Apr. 17, 2001

(54) METHOD AND APPARATUS FOR DELIVERING MULTIMEDIA CONTENT BASED ON NETWORK CONNECTIONS

(75) Inventors: Michelle Yoonkyung Kim, Scarsdale; Asser Nasreldin Tantawi, Somers; Edward Cholchin So, Flushing; Marc Hubert Willebeek-LeMair, Millwood, all of NY (US)

(73) Assignee: International Business Machines Corporation, Armonk, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/974,442

(22) Filed: Nov. 20, 1997

(51) Int. Cl.⁷ .................................................. G06F 15/173
(52) U.S. Cl. ......................... 709/224; 709/232; 709/235
(58) Field of Search .................................... 370/229, 232, 370/235, 394, 462, 506; 709/217, 224, 231, 232, 235, 236; 382/232; 713/501

(56) References Cited

U.S. PATENT DOCUMENTS

| 5,541,919 | * | 7/1996 | Yong et al. | 370/506 |
|---|---|---|---|---|
| 5,577,258 | * | 11/1996 | Cruz et al. | 709/231 |
| 5,623,490 | * | 4/1997 | Richter et al. | 370/462 |
| 5,706,486 | * | 1/1998 | Cruz et al. | 713/501 |
| 5,737,531 | * | 4/1998 | Ehley | 709/208 |
| 5,754,783 | * | 5/1998 | Mendelson et al. | 709/217 |
| 5,761,438 | * | 6/1998 | Sasaki | 370/229 |
| 5,768,535 | * | 6/1998 | Chaddha et al. | 370/394 |
| 5,905,730 | * | 5/1999 | Yang et al. | 370/462 |
| 5,928,330 | * | 7/1999 | Goetz et al. | 709/231 |

* cited by examiner

*Primary Examiner*—Zarni Maung
*Assistant Examiner*—Patrice Winder
(74) *Attorney, Agent, or Firm*—McGuireWoods, LLP; Douglas W. Cameron, Esq.

(57) ABSTRACT

A method and an apparatus adaptively and dynamically deliver multimedia content based on continuously monitored network conditions. Given the temporal relationships among the multimedia items in the multimedia data stream and also the current network condition, the method and apparatus compute a transmission schedule such that the transmission delay and the burstyness of the network bandwidth utilization are minimized, while maintaining the integrity of the multimedia presentation.

9 Claims, 9 Drawing Sheets

METHOD AND APPARATUS FOR DELIVERING MULTIMEDIA CONTENT BASED ON NETWORK CONNECTIONS

BACKGROUND OF THE INVENTION

1. Field of the Invention

The present invention generally relates to multimedia systems for network applications and, more particularly, to a method and apparatus for adaptively and dynamically delivering multimedia content based on continuously monitored network conditions.

2. Description of the Prior Art

Multimedia presentations have become popular on networks, including the Internet. A multimedia presentation may contain text, graphics, action video, sound, and the like, where the various objects are related temporally as well as spatially. Transmitting such a multimedia stream between a server and a client across networks could potentially create bursty network conditions. A bursty network bandwidth profile is undesirable from both a server and network standpoint since it is difficult to characterize and allocate or reserve resources for such a data stream.

SUMMARY OF THE INVENTION

It is therefore an object of the present invention to provide a method and apparatus for adaptively and dynamically delivering multimedia content based on continuously monitored network conditions.

Given the temporal relationships among the multimedia items in the stream and also the current network condition, the present invention computes a transmission schedule such that the transmission delay and the burstyness of the network bandwidth utilization are minimized, while maintaining the integrity of the multimedia presentation.

According to the invention, there is provided a method and apparatus for selecting and scheduling the transmission of multimedia objects within a multimedia data stream based on network conditions and/or viewer capabilities. Objects (versions) are defined within the multimedia contingent and their temporal relationship to each other. An estimated transmission schedule of the multimedia objects is produced based on the network conditions and the object temporal constraints. The resulting viewer delay is then calculated based on the transmission schedule and a comparison to a target delay by adding the estimated delay in transmission for each of the objects. Multimedia objects are iteratively modified (selecting versions of) to achieve a desired target delay.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
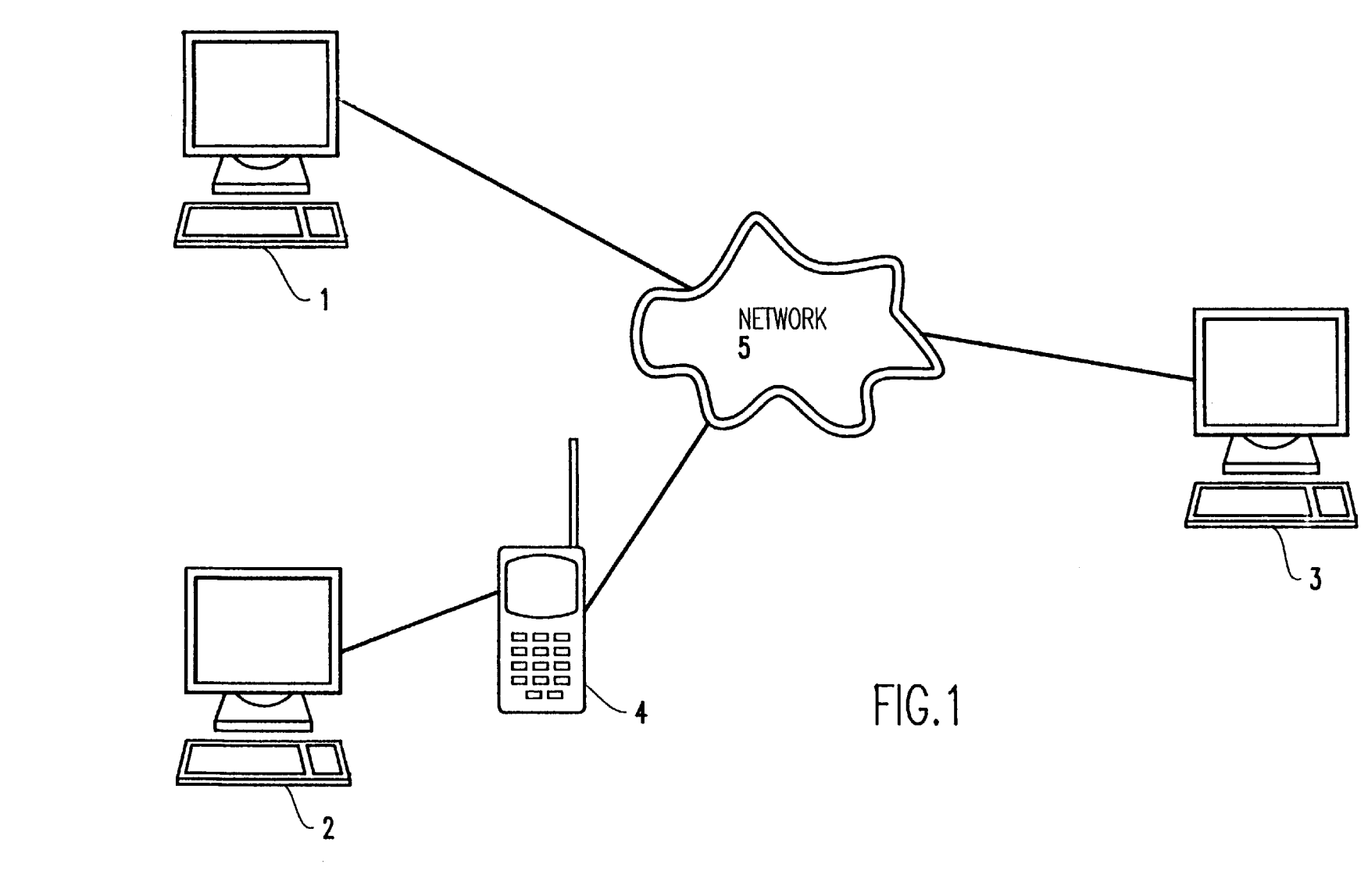
FIG. 1 is a high level block diagram illustrating a generic computer network on which the present invention may be implemented.

Referring now to the drawings, and more particularly to FIG. 1, there is shown an exemplary hardware environment which may include two or more computers 1,2 and 3 and an interconnecting network 5. A computer may also be connected to the network via telephone line 4. The computers 1,2 and 3 may be personal computers, such as the International Business Machines (IBM) Corporation's PC family of products, or workstations, such as IBM's RS/6000 workstation. The network 5 may be a local area network (LAN), such as the IBM Token-ring Network or an Ethernet network, or a larger network, such as the Internet.

Figure 2:
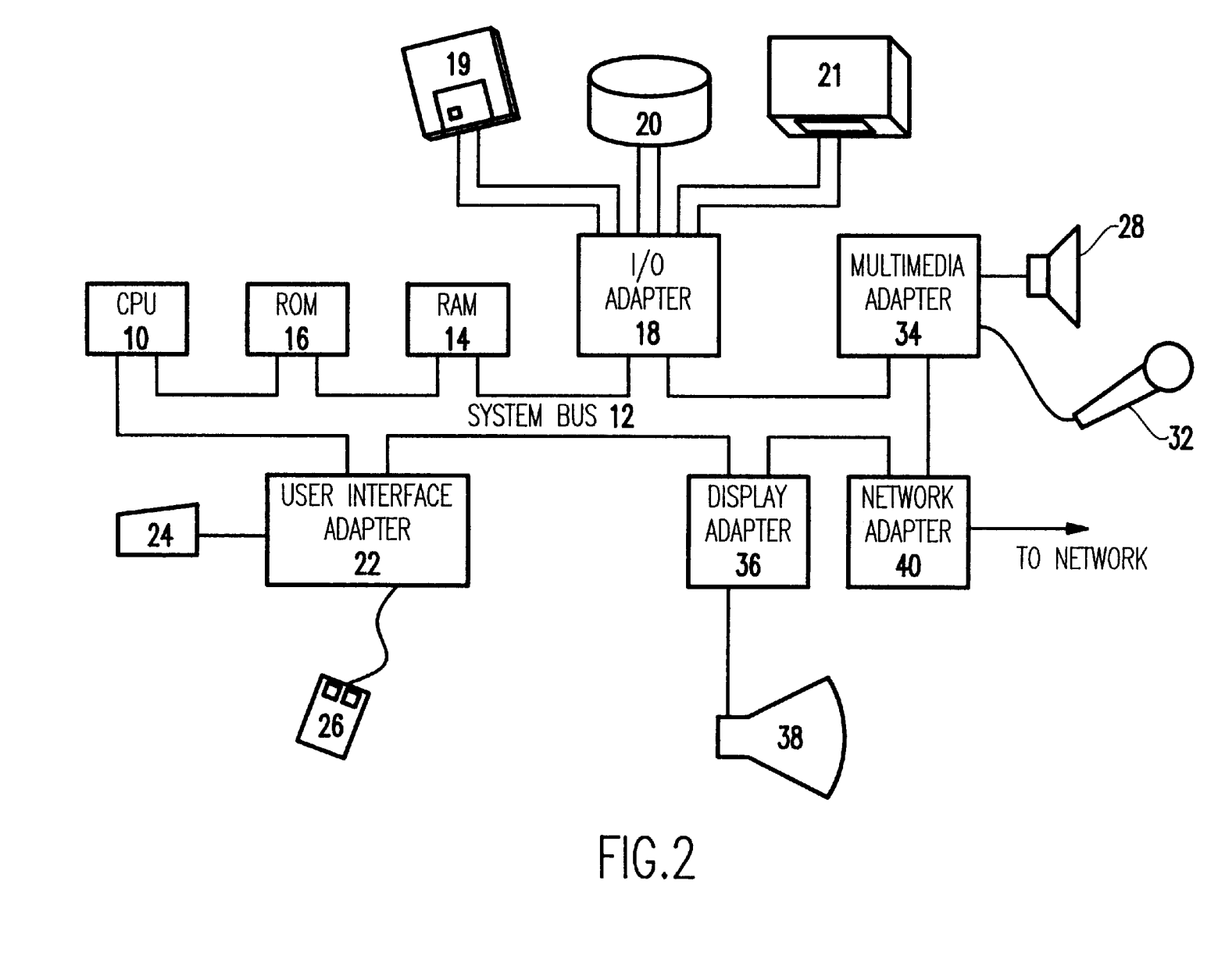
FIG. 2 is a block diagram of a typical personal computer or workstation architecture of the type that may be used in the network of FIG. 1.

As used herein, personal computers and workstations may be used interchangeably. FIG. 2 illustrates a typical computer hardware configuration which includes a central processing unit (CPU) 10, which may conform to Intel's X86 architecture or may be a reduced instruction set computer (RISC) microprocessor such as IBM's PowerPC microprocessor. The CPU 10 is attached to a system bus 12 to which is attached a read/write or random access memory (RAM) 14, a read-only memory (ROM) 16, an input/output (I/O) adapter 18, and a user interface adapter 22. The RAM 14 provides temporary storage for application program code and data, while ROM 16 typically includes the basic input/output system (BIOS) code. The I/O adapter 18 is connected to one or more Direct Access Storage Devices (DASDs), such as, for example, a floppy drive 19, a hard disk drive 20 and a CD-ROM 21. The hard disk drive 20 typically stores the computer's operating system (OS), such as IBM's OS/2 operating system or Microsoft® Windows® 95 or NT operating systems, and various application programs, each of which are selectively loaded into RAM 14 via the system bus 12. The user interface adapter 22 has attached to it a keyboard 24, a mouse 26, and/or other user interface devices (not shown).

The personal computer or workstation also includes a display 38, which may be, for example, a cathode ray tube (CRT) display but which also may be a liquid crystal display (LCD) or other suitable display. The display 38 is connected to the system bus 12 via a display adapter 36. A multimedia adapter 34, such as Creative Lab's Sound Blaster® adapter, is connected to the system bus 12 and to a microphone 32 and speaker 28. Other audio/video (A/V) I/O devices (not shown) may be attached.

In a networked environment, there is a notion of client and server computers. A computer may play the role of a client, server or both. Attached to each personal computer is a network adapter 40, such as IBM's Token-ring Network adapter, which connects the computer to the network. The network is a medium through which computers communicate with each other. The network comes in various topologies and configurations which include Local Area Networks (LAN) or a Wide Area Network (WAN). A LAN is used to connect PCs situated in a small area such as a building or a college campus. A WAN refers to a system of interconnection of computers located in a geographically wide area such as a city, a country or even the entire world in the case of the Internet. A WAN is inherently more complex in nature, and a variety of connection options are available. A computer participating in a WAN may have a direct digital connection to the WAN service provider, or it may be connected to the high speed backbone network via a modem, which is a device that connects the computer to a telephone company's telephone network, or other public switched networks. Different connection options have different capacity and performance characteristics. In general, LANs support high speed communications. Network speed is usually denoted in terms of bits per second (bps), that is to say, the number of binary data units that can be transmitted per second. LANs can typically support transmission rates of up to 16 million bps, and technologies that provide much higher throughput are becoming available. WANs, however, typically provide lower throughput. The telephone network through which many computers are connected to the global Internet, for example, can only support 22800 or 33600 bps today, although new emerging technologies such as ISDN, cable modem, digital subscriber loop (DSL), can support higher throughput.

WANs are typically less reliable than LANs. WANs show a high frequency of failures, and the traffic (digital data) they carry can be bursty; that is, the actual performance at any given moment depends on the load on the network and, therefore, is difficult to predict.

For the purpose of this invention, a client is a personal computer or workstation which interacts with the user to display multimedia presentations, and a server is a personal computer or workstation that stores and transmits the objects that comprise the multimedia presentations.

Figure 3:
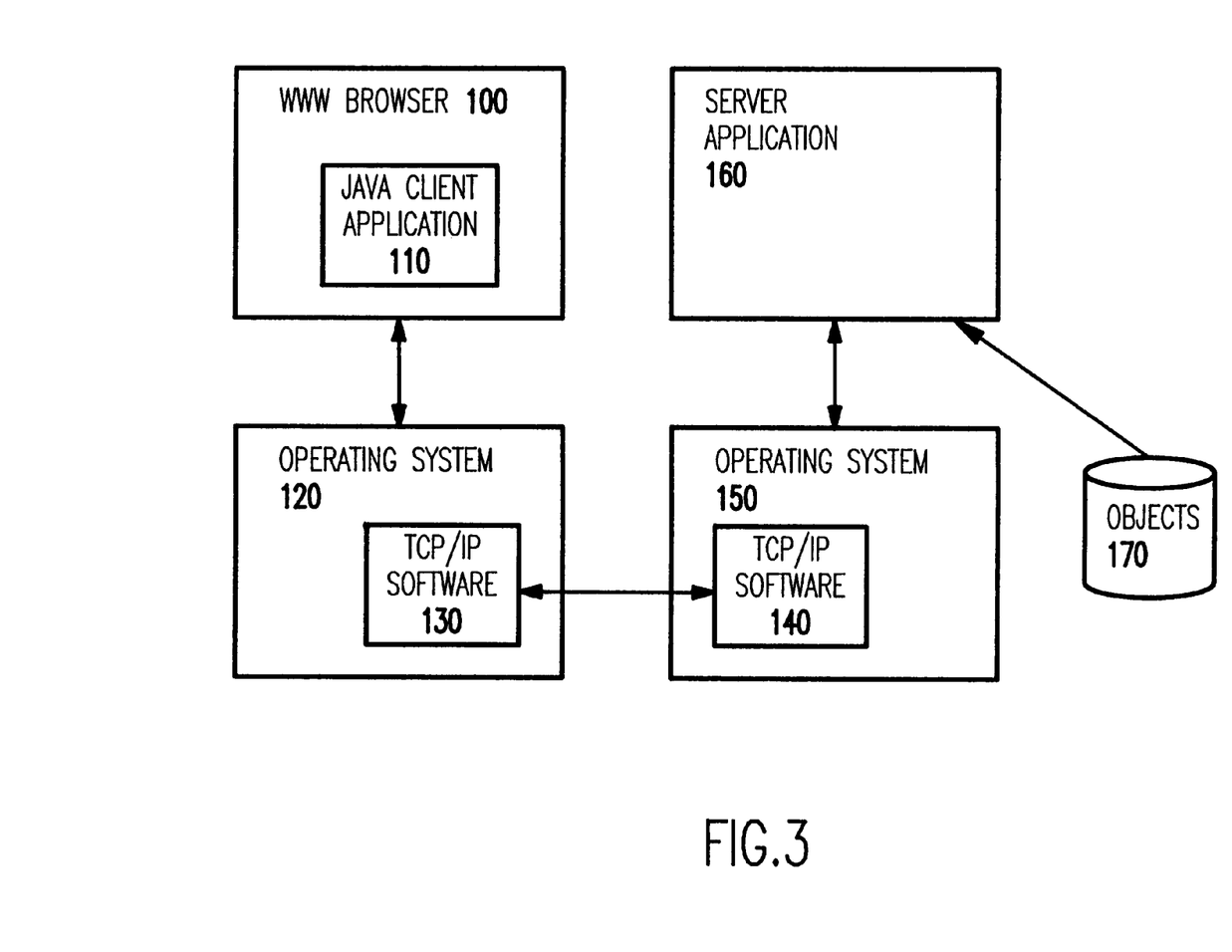
FIG. 3 is a block diagram showing the data flow in the software environment which supports the present invention.

FIG. 3 is a block diagram of the major software components. The left-hand side represents the client, and the right-hand side, the server. This inventive approach has been implemented in Sun Microsystem's Java™ programming language. (Java is a trademark of Sun Microsystems, Inc).

The Java™ programming language is independent of the underlying computer platforms, and is rich in graphical user interface (GUI), and network support is built in the language. A user typically uses a World Wide Web (WWW) browser 100, such as Netscape® Corporation's Navigator™ to download the Java™ multimedia presentation program 110, to his/her PC or workstation which, in turn, communicates with the server application program 160, through the TCP/IP (Transmission Control Protocol/Internet Protocol) communication software 130, which is part of the Operating System (OS) software 120. The server application 160 also uses the TCP/IP service 140 in its own Operating System 150. The server contains the multimedia objects 170 to be displayed by the client application program. (Netscape and Navigator are trademarks of Netscape Communications Corp.)

TCP/IP is a widely used communication method in the network environment. It defines a suite of protocols by which participating programs on different computers can transmit data between them without regard to the differences in the underlying hardware configurations and the network connection mechanisms. In TCP/IP protocol, the client and server programs establish a virtual connection path, not unlike a telephone connection, through which they can exchange data. In an alternate transport protocol, UDP/IP, packets of data with given sizes are mailed individually with each packet having its own destination address. TCP/IP provides much more reliable delivery service, but it is generally slower than UDP/IP. Both protocols are used in this invention, as the principles detailed below apply equally to both.

Process Overview

In the practice of this invention, a multimedia presentation can be considered as a set of synchronized events, each of which corresponds to an object being displayed at a given point in time which is determined based on the temporal relationship among the objects. A multimedia object can have a spatial property, for example an image or text. Or it can have an intrinsic length in time (an audio clip), or both (a video clip). An object without a temporal value such as text can be displayed for any arbitrary duration as specified by the author of the presentation. For such objects, it is often useful to define the minimum and the maximum allowable durations. Such objects are called elastic objects. Furthermore, an object with a flexible time length may be an acceptable alternative to an object with a fixed time value. For instance, a text object may be a suitable substitute for a long-running video, if the conditions do not permit timely delivery and display of the video object. In general, a displayable object is a set of prioritized versions with the equivalent application content.

In a networked environment, objects must be sent from the server to the client over a communication path with a finite capacity. The objects must be transmitted ahead of the desired display time. Network conditions, however, are not generally uniform: load fluctuations may adversely affect the actual transmission delay. A multimedia object does not necessarily have to be transmitted as a single unit. A long running video clip, for example, may be broken up into discrete chunks, called packets, so that the display (playing) can start immediately when enough packets have been delivered to the client. In fact, all multimedia objects, regardless of their properties, can be viewed as consisting of one or more packets of data to be transmitted according to a schedule. Because of this, the term "object" and "packet" are used interchangeably in this description. We can loosely define a multimedia stream to be the delivery and display of packets comprising a multimedia presentation according to a set schedule.

Figure 4:
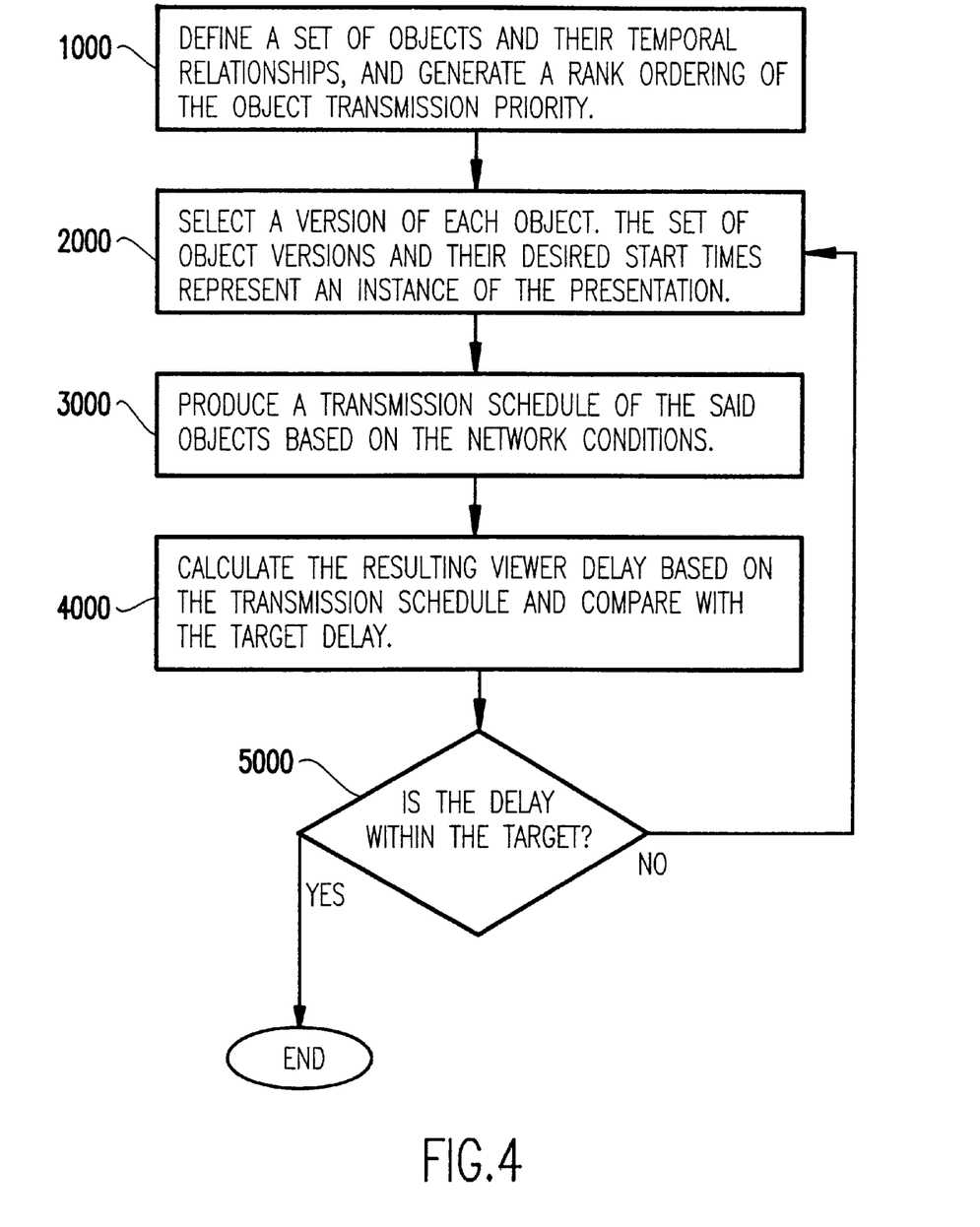
FIG. 4 is a flow diagram of the overall process implemented by the present invention.

The overall process can be summarized in four steps, as shown in FIG. 4. Initially, in function block 1000, objects and their versions of a multimedia presentation and their temporal relationship to each other are defined. A rank ordering of the object transmission priority is then generated. An instance of the presentation is created in function block 2000 by choosing a version for each object. A transmission schedule of the objects is produced in function block 3000 based on the network conditions. The resulting viewer delay is calculated in function block 4000 based on the transmission schedule, and the calculated delay is compared with the target delay. A test is then made in decision block 5000 to determine if the initial delay is longer than the target delay. If so, a new set of versions is selected, and the process loops back to function block 2000 to iterate until the desired target is achieved; otherwise, the process ends.

Packet Delay Estimation and Transmission Scheduling

Given a prioritized list of objects, we need to produce a schedule by which the objects, or packets equivalently, are to be transmitted from the server to the client such that the objects can be displayed at their desired times. The transmission time for a given packet is largely a function of the packet size and the network bandwidth. However, due to the uncertain nature of the network performance, the precise transmission delays cannot be known before hand. The principles behind the scheduling apparatus of this invention hinge on the observation that the actual packet delays are largely proportional to the packet size, and therefore simple statistical tools can be utilized to arrive at a reasonable estimation of expected delays expressed as a function of the packet size.

Figure 5:
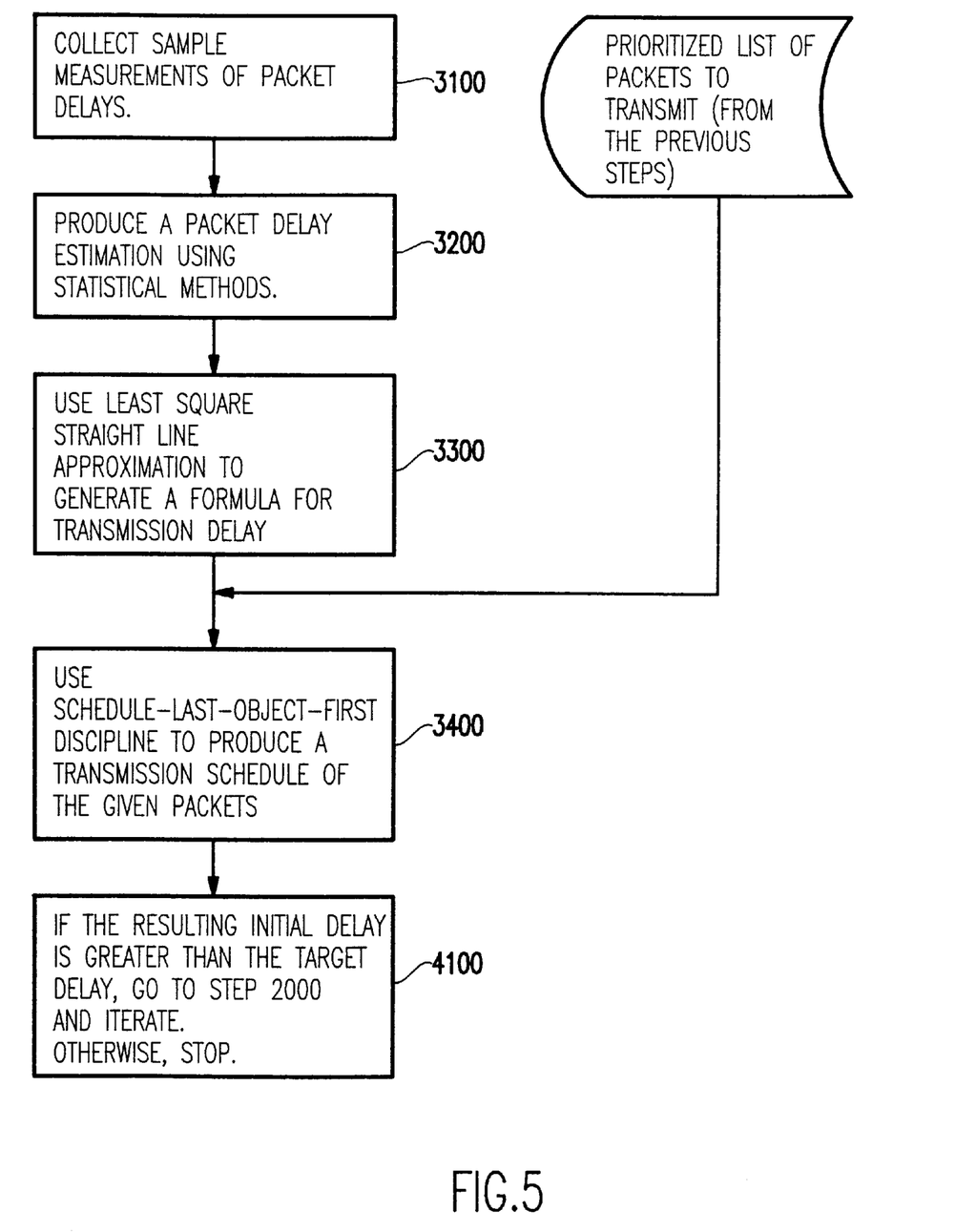
FIG. 5 is a flow diagram of the process of delay estimation and transmission scheduling implemented by the present invention.

FIG. 5 summarizes the scheduling process. First, we observe the actual delays and take sample measurements for various packet sizes in function block 3100. In function block 3200, we derive a statistical estimation of the sample delays. In function block 3300, we use the Least Square Straight Line Approximation method to generate a formula for packet delay estimation. Finally, in function block 3400, we define the Schedule-Last-Object-First (SLOF) algorithm to generate a transmission schedule for a given set of packets. In addition to the schedule, SLOF produces the initial delay that is expected to occur before the first packet is displayed at its desired point in time. If this delay is not acceptable, i.e., greater than some predetermined target value, as determined in function block 4100, we go back to the function block 2000 (FIG. 4) to select a new set of objects or versions and iterate until the desired target delay is achieved. The detailed descriptions of these steps are given below.

Packet Delay Estimation

We need to estimate the delay from the time a packet is requested from a client until the packet is completely received by the client from the server. Although the delay is roughly proportional to the network bandwidth, the precise length of delay cannot be known. This is because the throughput depends on the load of the network, and congestion can add additional delays. This invention includes a technique by which the long term behavior of the network can be characterized in a statistical manner such that the expected delay for a packet of a given size can be estimated with a high degree of confidence.

Figure 6:
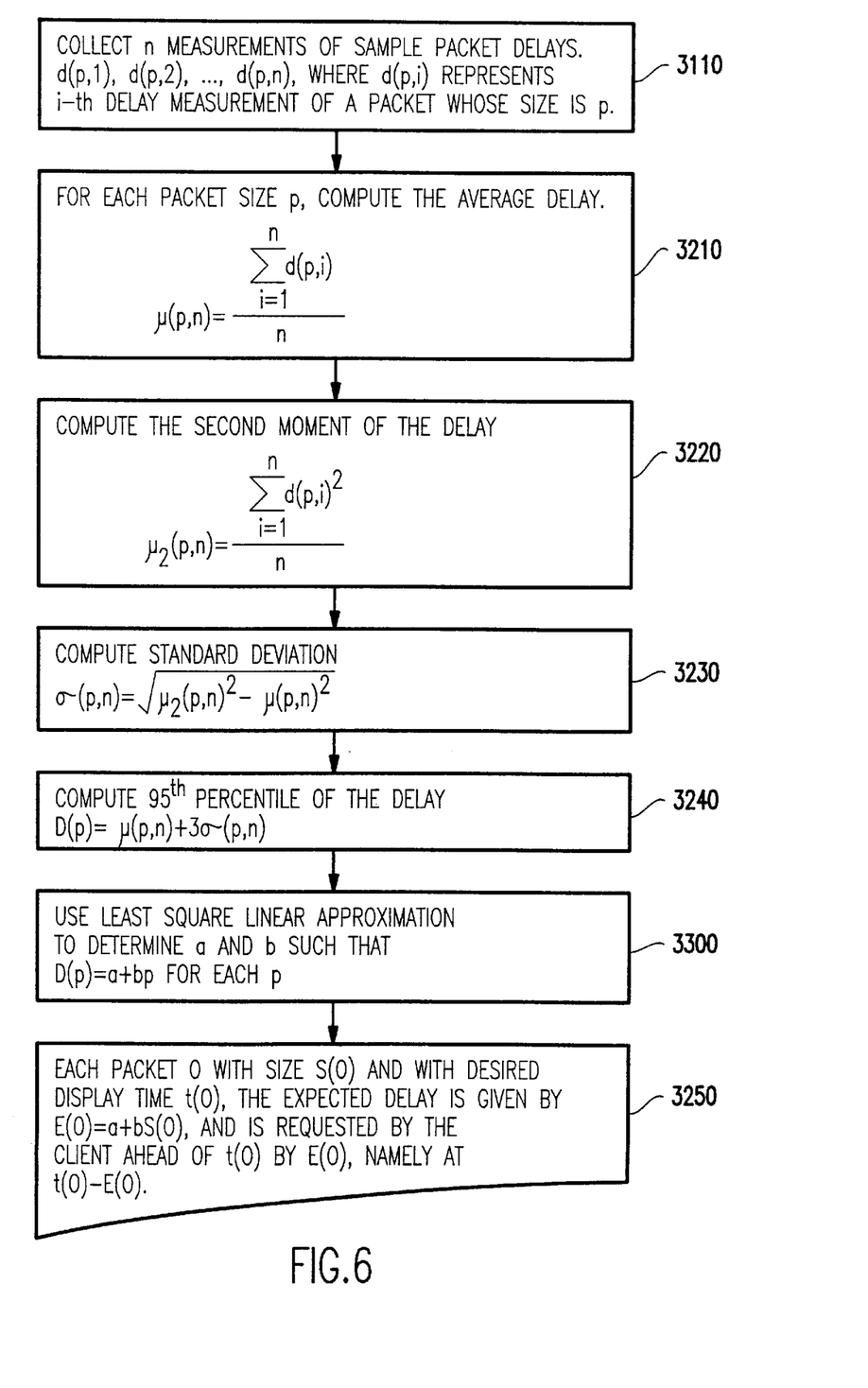
FIG. 6 is a flow diagram of the process of packet delay estimation implemented by the present invention.

Referring to the accompanying FIG. 6, we start out in function block 3110 with a set of sample measurements taken over a period of time. These represent the actual delays observed for given packet sizes in the current network environment. More precisely, this delay represents the total round-trip, end-to-end latency. That is, the said delay is the total amount of time it takes from the moment the client sends a transmission request until the entire packet has arrived at the client. For each packet size in the sample, we first calculate the average delay in function block 3210 given by the formula:

$$\mu(p, n) = \frac{\sum_{i=1}^{n} d(p, i)}{n}.$$

In function block 3220, we find the second moment of the delay for the given packet size:

$$\mu_2(p, n) = \frac{\sum_{i=1}^{n} d(p, i)^2}{n}.$$

Next, we compute the standard deviation of the delay in function block 3230:

$$\sigma(p, n) = \sqrt{\mu_2(p, n)^2 - \mu(p, n)^2}$$

Finally, in function block 3240, we can derive the $95^{th}$ percentile of the delay, which represents the value within which the delays of 95 percent of packets of a given size in the sample fall.

$$D(p) = \mu(p,n) + 3\sigma(p,n).$$

In function block 3300 we use Least Square Linear Approximation to derive a formula for computing the expected delay as a function of the packet size. Once the desired display time and the expected delay are known, we can calculate in function block 3250 the time at which the client has to send a transmission request to the server for a given packet. The next section will discuss these two steps in detail.

Least Square Straight Line Approximation

Our measurements suggest that both $\mu(p,n)$ and $\sigma(p,n)$ maybe approximated by linear functions of the variable p. Intuitively, the delays encountered in the network transmission, packet processing, and packet retrieval and buffering are linearly proportional to the packet size. Thus, one can use a Least Square Straight Line Approximation to express D(p) as D(p)=a+bp.

Figure 7:
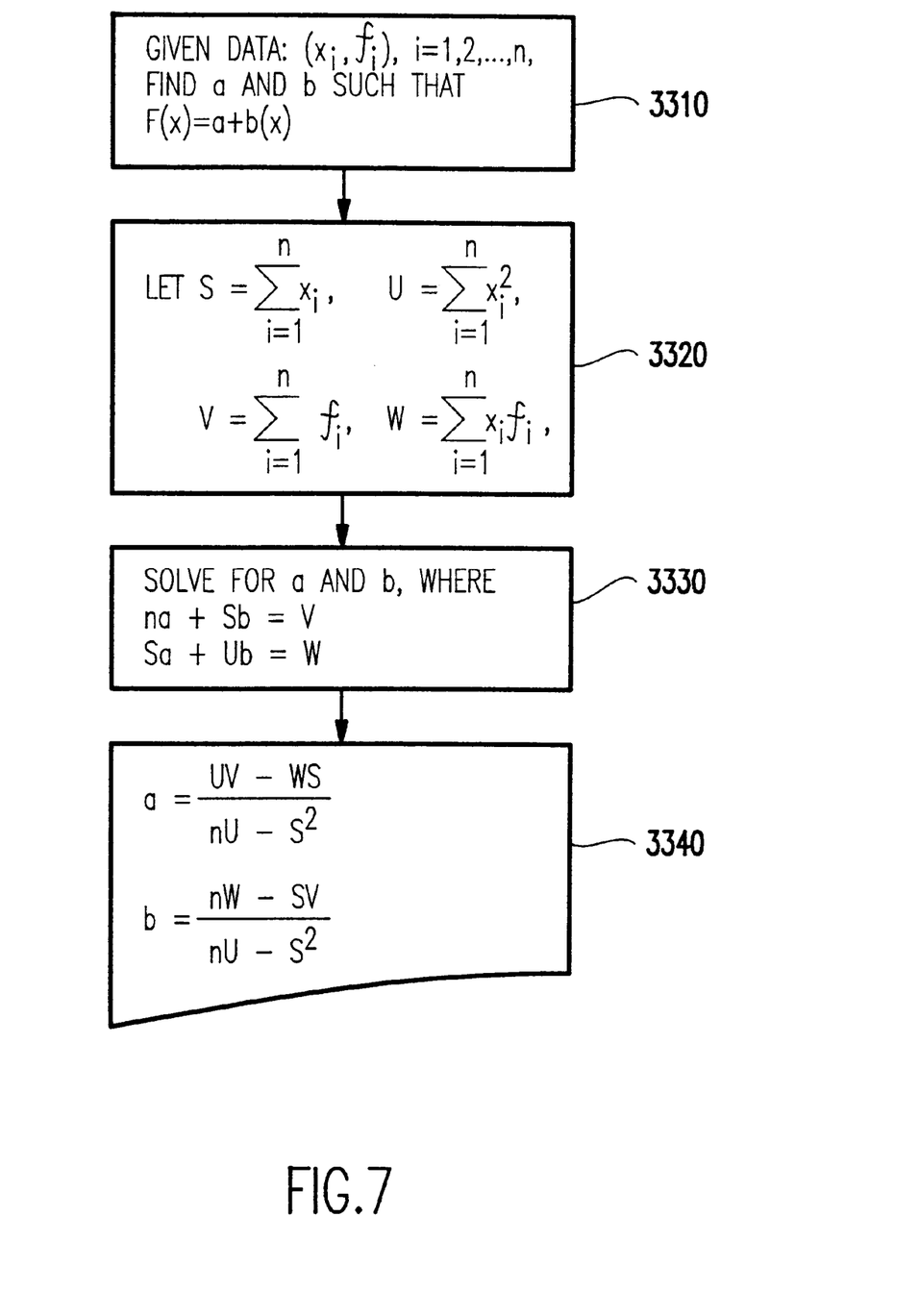
FIG. 7 is a flow diagram of the process of least square straight line approximation implemented by the present invention.

Referring to FIG. 7, the Least Square Straight Line determines the values of a and b, given a set of points, $(x_i, f_i)$, i=1,2, ... ,n. The process begins in function block 3310. Here $x_i$ represents the packet size, and $f_i$ represents D(p) given above. In function block 3320, we substitute for various summations to simplify equations.

$$\text{Let } S = \sum_{i=1}^{n} x_i, \ U = \sum_{i=1}^{n} x_i^2, \ V = \sum_{i=1}^{n} f_i, \ W = \sum_{i=1}^{n} x_i f_i.$$

In function block 3330, we solve for a and b, a system of two equations given as follows.

$$na + Sb = V$$

$$Sa + Ub = W$$

In function block 3340, we have obtained the values of a and b as expressed below.

$$a = \frac{UV - WS}{N - S^2}$$

$$b = \frac{nW - SV}{N - S^2}$$

Thus, we have experimentally derived a general formula for estimating the expected delay for any packet of size p. An object O with size S(O), would have to be requested by the client ahead of the desired object display time t(O) by an amount of time accounting for the expected delays, namely at time t(O)−(a+bS(O))

Schedule-Last-Object-First Discipline

Given n objects whose desired display times and the expected delays are known, this algorithm computes a transmission schedule of the objects so that the objects can be displayed at their designated time instants. The process is illustrated in the flow diagram of FIG. 8.

Figure 8:
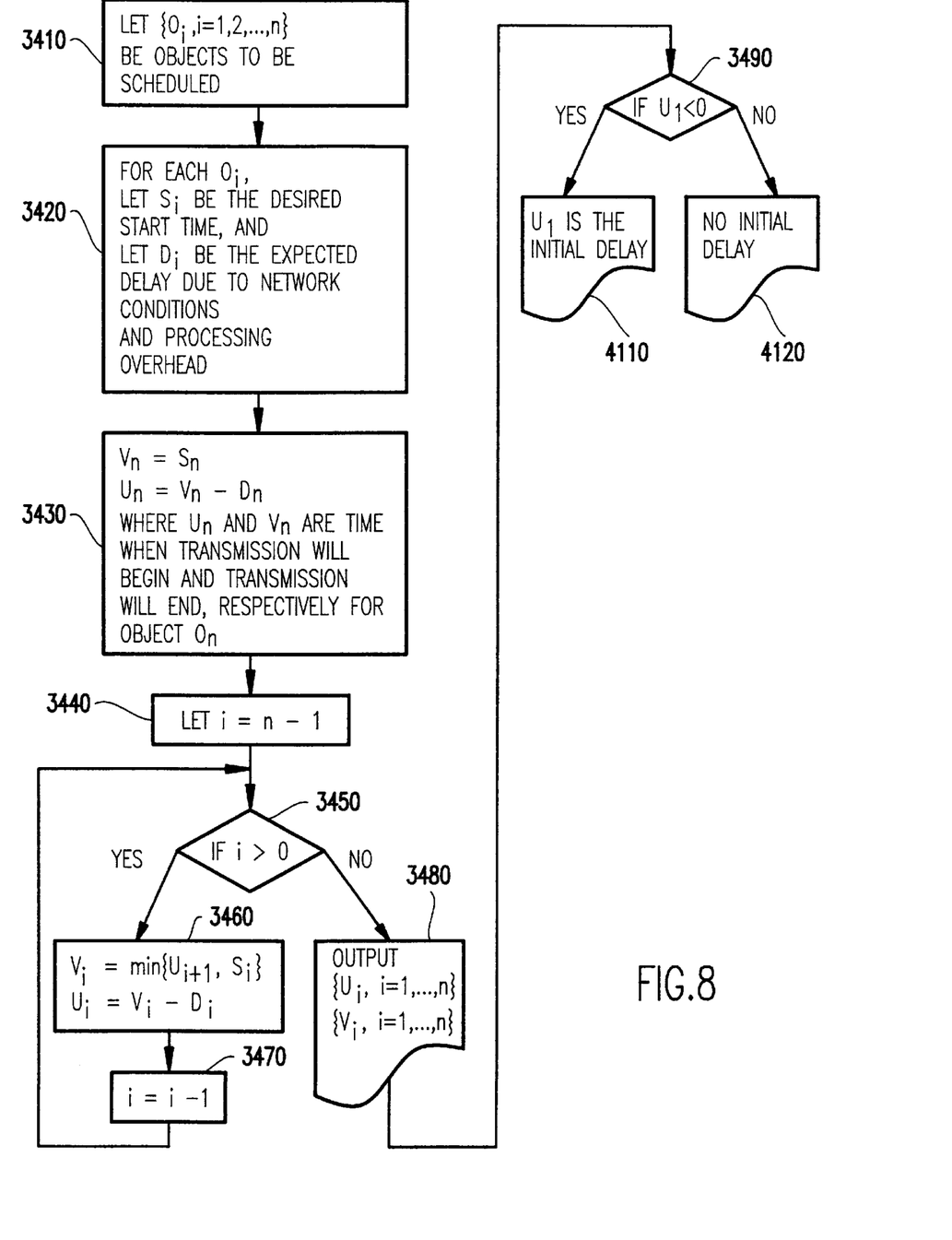
FIG. 8 is a flow diagram of the schedule-last-object-first process implemented by the present invention.

Initially, in function block 3410, consider n objects $\{O_i, i=1,2,\ldots,n\}$. Each object has a set of attributes such as timing, size, and priority. The desired start time attribute of an object is the relative time at which the object is to be displayed to the user. Let the desired start time of $O_i$ be denoted by $S_i$, $i=1,2,\ldots,n$. Without loss of generality, let us assume that $S_1 \leq S_2 \leq \ldots \leq S_n$. In order for an object to be ready for display at a client, the object must be delivered from a server that holds a copy of the object to the client, through a transport network, before the display time. Let $U_i$ and $V_i$ be the desired time instants at which the sever starts sending the object and the client receives the whole objects, respectively. The difference $D_i = V_i - U_i$ represents the anticipated delays due to processing at the server, network communication, and processing at the client. Given $\{S_i, i=1,2,\ldots,n\}$ and $\{D_i, i=1,2,\ldots,n\}$ as in function block 3420, a schedule defines the values of $\{V_i, i=1,2,\ldots,n\}$ or equivalently $\{U_i, i=1,2,\ldots,n\}$. In the Schedule-Last-Object-First scheduling discipline, we obtain the values of $V_n, V_{n-1}, \ldots, V_i$, in that descending order. In function block 3430, we let $V_n$, the transmission ending time of object $O_n$, be equal to $S_n$. Then it follows that $U_n = V_n - D_n$. Now, starting with i=n-1, we compute $U_i$ and $V_i$ iteratively until we have no more objects left. More specifically, i is set to n-1 in function block 3440, and a test is made in decision block 3450 to determine if i is greater than zero. For each object $O_i$, where i<n let $V_i = U_{i+1}$ or $S_i$, whichever is smaller, and once the value of $V_i$ is obtained, let $U_i = V_i - D_i$, as indicated in function block 3460. In function block 3470, we decrement i, and continue the loop by going back to decision block 3450. When all objects are exhausted, the set $\{U_i\}$ represents the scheduled transmission starting time instants of all objects in function block 3480. A test is then made in decision block 3490 to determine if $U_1$, the transmission starting time of the first object, is negative. If so, it represents the initial delay in function block 4110; otherwise, there is no initial delay in function block 4120. The initial delay is the time period between $U_i$ and relative time 0, and represents the expected amount of time the client has to wait before the actual presentation can begin.

Figure 9:
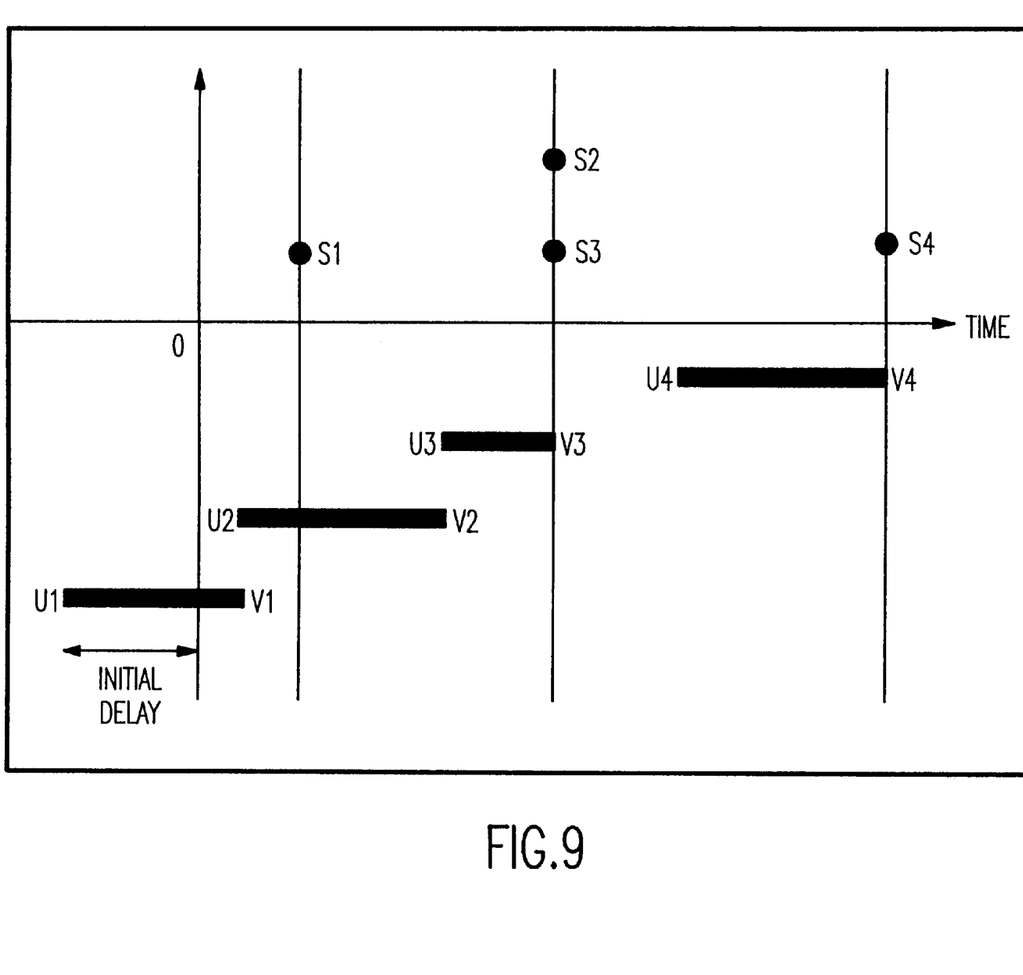
FIG. 9 is a temporal diagram illustrating the schedule-last-object-first process.

FIG. 9 depicts an example of the Schedule-Last-Object-First scheduling discipline, where four objects are to be transmitted to the client. The set $\{S_i, i=0,\ldots,4\}$ represents the desired starting times of the four objects, and the set $\{U_i, i=0,\ldots,4\}$ represents the computed points in time at which transmission of the objects are to begin. The transmission times are scheduled sequentially in reverse order. Firstly, we set the end of transmission of the last object to coincide with its desired starting time, and we determine the transmission start time, $U_4$. The second and the third objects are to be displayed at the same time. The amount of time between $S_1$ and $S_2$, however, is not long enough for complete transmission of the second and the third objects, such that the transmission of the second object must start before $S_1$. Thus, the difference between $U_2$, the transmission start time of the second object, and $S_1$, the desired display time of the first object, represents the amount of time that cannot be used for transmission of the first object, whose transmission has to start well ahead of its desired display time. In general, the total amount of such delays accumulated at the start of the presentation, if it exists, is called the initial delay.

The example shows that there is an initial delay. If the initial delay is not within the target delay, we can choose a new set of objects or versions thereof, and repeat the whole procedure until the desired delay target is met.

While the invention has been described in terms of a single preferred embodiment, those skilled in the art will recognize that the invention can be practiced with modification within the spirit and scope of the appended claims.

Having thus described our invention, what we claim as new and desire to secure by Letters Patent is as follows:

1. A method of dynamically scheduling the delivery of multimedia objects in a multimedia presentation based on network performance considerations comprising the steps of:

continuously monitoring network conditions; and adaptively and dynamically selecting and scheduling transmission of multimedia objects within a multimedia data stream based on monitored network conditions so that a transmission delay and burstyness of a network bandwidth utilization are minimized while maintaining integrity of the multimedia presentation by:

(a) defining the multimedia objects and their temporal relationship to each other;

(b) producing an estimated transmission schedule of the multimedia objects based on monitored network conditions and object temporal constraints;

(c) calculating a resulting viewer delay based on the transmission schedule and comparing to a target delay by adding an estimated delay in transmission for each of the multimedia objects; and (d) iteratively modifying the multimedia objects to achieve a desired target delay.

2. The method of claim 1 wherein the step of continuously monitoring network conditions comprises the steps of:

collecting sample measurements of packet delays;

producing a packet delay estimation using statistical methods; and generating a formula for transmission delay.

3. The method of claim 2 wherein the step of generating a formula for transmission delay is based on a least square line approximation.

4. The method of claim 2 wherein the step of producing a packet delay estimation comprises the steps of:

computing an average delay for each packet size; and computing a second moment of the average delays and average deviations.

5. The method of claim 4 wherein the step of generating a formula for transmission delay is based on a least square line approximation.

6. The method of claim 2 wherein the step of producing an estimated transmission schedule of the multimedia objects comprises the steps of:

receiving a prioritized list of packets to transmit; and using a schedule last-object-first discipline to produce a transmission schedule of packets.

7. A method of dynamically scheduling the delivery of multimedia objects in a multimedia presentation based on network performance considerations comprising the steps of:

continuously monitoring network conditions; and adaptively and dynamically selecting and scheduling transmission of multimedia objects within a multimedia data stream based on monitored network conditions so that a transmission delay and burstyness of a network bandwidth utilization are minimized while maintaining integrity of the multimedia presentation by:

(a) defining the multimedia objects within a multimedia content and their elastic temporal relationship to each other;
(b) creating a rank ordering of multimedia object transmission priority;
(c) calculating a resulting viewer delay interval due to elastic constraints based on network conditions and comparing to a target delay; and
(d) iteratively modifying said multimedia objects to achieve desired target delay.

8. A computer network comprising:

at least one server and one or more clients connected in a network the server delivering a multimedia presentation in a data stream to at least one of the clients, the server including means for continuously monitoring network conditions, wherein the means for continuously monitoring network conditions further comprises:
  means for collecting sample measurements of packet delays;
  means for producing a packet delay estimation using statistical methods; and
  means for generating a formula for transmission delay; and
means for adaptively and dynamically selecting and scheduling transmission of multimedia objects within a multimedia data stream based on current monitored network conditions so that a transmission delay and burstyness of a network bandwidth utilization are minimized while maintaining integrity of the multimedia presentation, wherein the means for adaptively and dynamically selecting and scheduling the transmission of multimedia objects within a multimedia stream based on monitored network conditions further comprises:
  means for defining the multimedia objects and their temporal relationship to each other;
  means for producing an estimated transmission schedule of the multimedia objects based on monitored network conditions and object temporal constraints;
  means for calculating a resulting viewer delay based on the transmission schedule and comparing to a target delay by adding an estimated delay in transmission for each of the multimedia objects; and
  means for iteratively modifying the multimedia objects to achieve a desired target delay.

9. The computer network recited in claim 8 wherein the means for producing an estimated transmission schedule of the multimedia objects comprises:
  means for receiving a prioritized list of packets to transmit; and
  means for producing a transmission schedule of packets using a schedule last-object-first discipline.

* * * * *